United States Patent [19]

Leopoldi et al.

[11] 4,173,826
[45] Nov. 13, 1979

[54] APPARATUS FOR CUTTING PILLS

[76] Inventors: Norbert Leopoldi, 4180 Marine Dr., Chicago, Ill. 60613; William P. Heinrich, 2709 W. Sterling Dr., McHenry, Ill. 60050

[21] Appl. No.: 934,336

[22] Filed: Aug. 17, 1978

[51] Int. Cl.$^2$ ............................................. B26B 11/00
[52] U.S. Cl. ....................................... 30/124; 225/103
[58] Field of Search .................. 225/105, 103; 30/124, 30/134, 135; 206/238, 528, 540

[56] References Cited

U.S. PATENT DOCUMENTS

| | | | |
|---|---|---|---|
| 3,439,664 | 4/1969 | Sylvester | 225/103 X |
| 3,517,871 | 6/1970 | Gaffney | 225/103 |
| 3,863,821 | 2/1975 | Van Bennekom | 225/105 |
| 4,118,862 | 10/1978 | Hensel | 30/124 |

Primary Examiner—Jimmy C. Peters

[57] ABSTRACT

A pill cutter of a relatively simple construction, including an upper and a lower member which are hingedly or otherwise affixed together at one end thereof so that one member may be pivotally rotated with respect to the other. On the inner facing surfaces of the upper and lower members of the pill cutter are disposed a pair of resilient pads which are positioned to engage one another when the upper and lower members are pressed together. One of the resilient members is of a split construction, and a wedge is disposed between the split halves thereof. This wedge preferably is of a height which is less than the thickness of the resilient pad so that the apex of the wedge is disposed below the surface of the resilient pad.

2 Claims, 5 Drawing Figures

APPARATUS FOR CUTTING PILLS

This invention relates to an improved pill cutter for cutting pills in halves, quarters and the like.

It is generally well-known that on numerous occasions, particularly with respect to children, that a half or a quarter of a pill is prescribed. Normally, in such an event, an attempt is made to divide the pill by placing it on a support surface and then attempting to cut or split the pill with a sharp instrument such as a knife. Generally, this results in the pill or the pieces thereof being scattered about the immediate area. Anyone who has attempted to split a pill in half, or a quarter, will readily attest to these facts.

Accordingly, it is an object of the present invention to provide an improved pill cutter for cutting pills.

Generally the pill cutter of the present invention is of a relatively simple construction, including an upper and a lower member which are hingedly or otherwise affixed together at one end thereof so that one member may be pivotally rotated with respect to the other. On the inner facing surfaces of the upper and lower members of the pill cutter are disposed a pair of resilient pads which are positioned to engage one another when the upper and lower members are pressed together. One of the resilient members is of a split construction, and a wedge is disposed between the split halves thereof. This wedge preferably is of a height which is less than the thickness of the resilient pad so that the apex of the wedge is disposed below the surface of the resilient pad.

In use, a pill to be divided is placed on the split one of the resilient pads over the wedge, so that effectively one half of the pill is disposed on each of the opposite sides of the wedge. Now, when the upper and lower members of the pill cutter are pressed together, the pill is initially captivated and contained between the resilient pads as the latter are compressed. As the upper and lower members are continued to be pressed together, ultimately the pill is pressed against the apex of the wedge and is subsequently cut or split in half by the wedge, as pressure is continued to be asserted to pinch the upper and lower members together. While the pill is split in half by the wedge, the pill halves are contained by the resilient pads and thus are prevented from flying out of the pill cutter. Also, the resilient pads prevent the pill from being crushed as the pill is being divided.

In the event it is desired to quarter the pill, one half of the pill is placed in the pill cutter over the wedge so that again the half pill is divided by the wedge. Now, when the upper and lower members are again compressed together, the half of the pill is further divided as it engages the wedge.

For a fuller understanding of the nature and objects of the invention, reference should be had to the following detailed description taken in connection with the accompanying drawings, in which.

DESCRIPTION OF A PREFERRED EMBODIMENT

Figure 1:
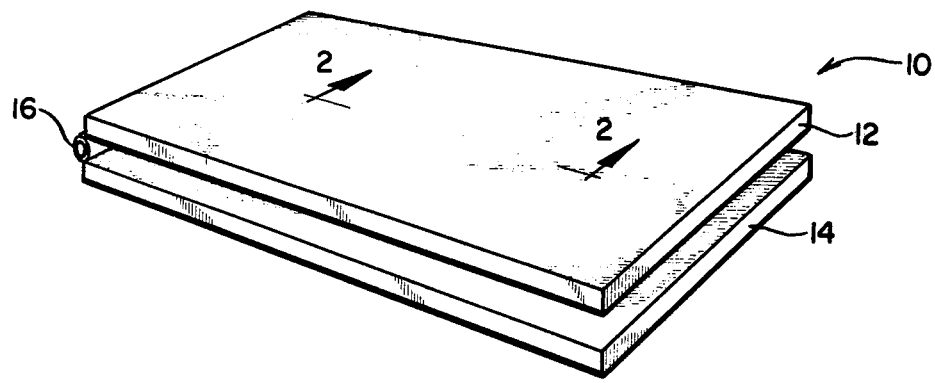
FIG. 1 is a perspective view of a pill cutter exemplary of the present invention.

Referring now to the drawing, in FIG. 1 there is illustrated a pill cutter 10 exemplary of the present invention, including an upper member 12 and a lower member 14 which are pivotally affixed together at one end thereof by means of hinge means 16 or the like. The upper and lower members 12 and 14 are not restricted to any particular shape and can be rectangular, as illustrated, or they can be oval shaped, square or circular, so long as the pill cutter functions in the manner described more fully below. Further still, the upper and lower members 12 and 14 can be of various different types of material but preferably are of a substantially rigid plastic because of the ease of manufacture and the resulting cost of the pill cutter. Further still, when fabricated of plastic, it is conceivable that the hinge means 16 can be an integrally formed living flexible hinge integrally formed with the upper and lower members 12 and 14.

Figure 2:
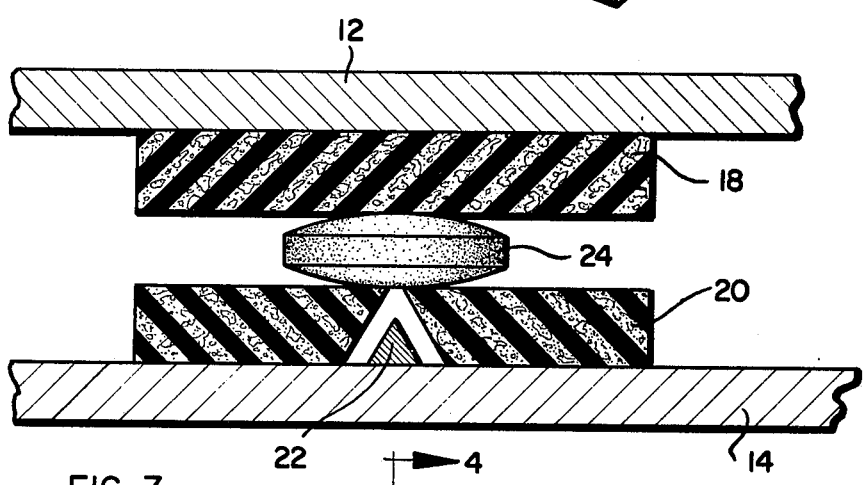
FIG. 2 is a sectional view taken generally along lines 2—2 of FIG. 1.
Figure 3:
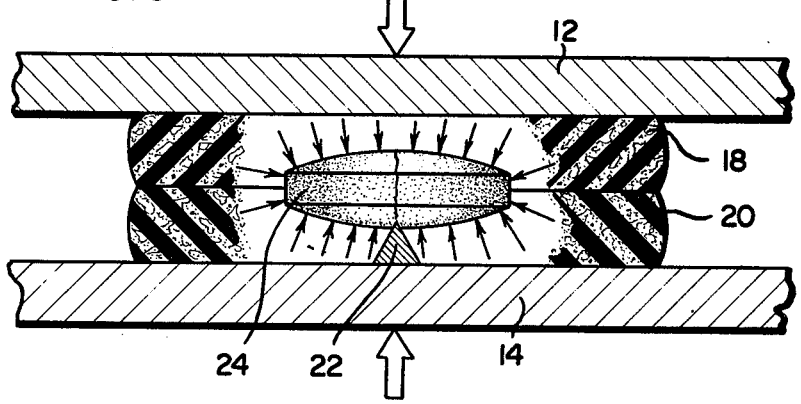
FIG. 3 is a sectional view generally like FIG. 2, when the upper and lower members of the pill cutter are compressed together.
Figure 4:
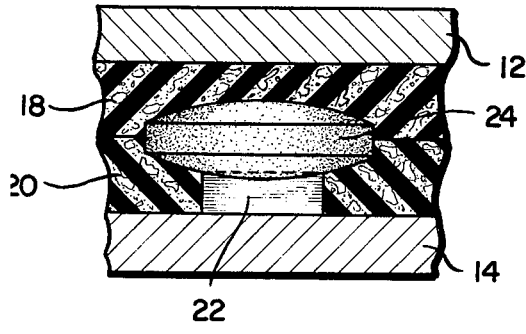
FIG. 4 is a partial sectional view taken generally along lines 4—4 of FIG. 3.

As can be best seen in FIGS. 2 and 3, a pair of resilient pads 18 and 20 are affixed to the opposed facing surfaces of the upper member 12 and lower member 14, and are positioned so that these resilient members are aligned and are compressed together when the upper and lower members 12 and 14 are pressed together. The resilient members 18 and 20 may be of rubber or other similar material.

It may be further noted that the resilient member 20 is of a split construction with the two halves slightly spaced apart. Disposed within the spacing between the two halves of the resilient member 20 is a cutting member 22 which, in the illustrated embodiment, is a triangular shaped wedge. Other cutting elements, such as for example, a knife edge could be utilized, if desired. It may be further noted that the apex of the cutting element or wedge 22 is disposed beneath the top surface of the resilient pad 20, for reasons set forth more specifically below.

In use, a pill such as the pill 24 is placed between the upper member 12 and the lower member 14, atop one of the resilient pads 18 and 20. Preferably, and most conveniently, the pill 24 is first placed atop the resilient pad 20 inasmuch as the spacing between the two halves of the resilient pad 20 provides an indication to the user of the pill cutter 10 as to how the pill should be placed in order to cut or split it in half. In other words, the pill 24 is placed on the resilient pad 20 so that substantially one half of the pill lies on each side of the spacing between the two halves of the resilient pad 20. When placed in this position, obviously the pill is disposed above the cutting element or wedge 22, so that the latter will engage the pill substantially centrally thereof, to divide it in half.

After the pill has been so placed on the resilient pad 20, the upper member 12 and the lower member 14 are pressed together and, initially, the pill 24 will be captivated and contained by the resilient pads 18 and 20, both of which will be compressed as the upper member 12 and the lower member 14 are continually pressed together. The pill 24, therefore, is captivated and prevented from being displaced.

As the user continues to press the upper member 12 and the lower member 14 together, the pill 24 engages the cutting element 22, i.e., the apex of the wedge 22, and as continued pressure is asserted, the pill 24 is cut or split in half by the cutting element 22. Again, since the pill 24 is effectively compressed into a pocket formed by the resilient pads 18 and 20, the pill halves when the pill is split are contained and prevented from being displaced.

After the pill has been cut or split in half, the upper member 12 and the lower member 14 are simply opened and the pill halves removed. It it is desired to quarter the pill 24, one half of the pill again is placed atop the resilient pad 20, over the cutting element 22, and the upper member 12 and the lower member 14 manipulated in the same described fashion, to once again split the half pill.

Figure 5:
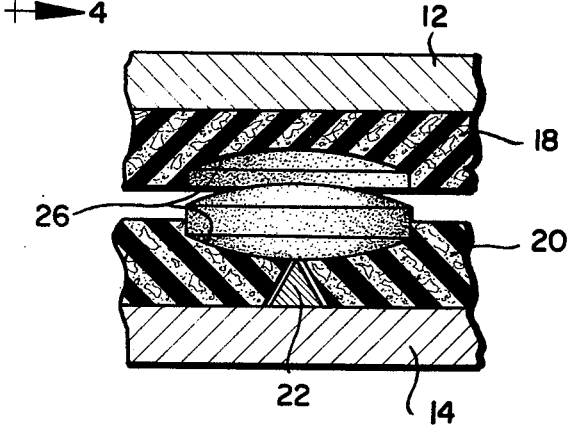
FIG. 5 is a sectional view generally like FIG. 4, illustrating a second embodiment of the invention.

In FIG. 5, there is illustrated an alternative construction for the resilient pads 18 and 20. In this case, one or the other or both of the resilient pads 18 and 20 are pre-formed with a pocket 26 which may substantially correspond with the configuration of a pill to be cut. The pocket 26 permits the pill to be seated within the pocket to position it within the pill cutter 10.

It will thus be seen that the objects set forth above, among those made apparent from the preceding description, are efficiently attained and certain changes may be made in the above construction. Accordingly, it is intended that all matter contained in the above description or shown in the accompanying drawings shall be interpreted as illustrative and not in a limiting sense.

Now that the invention has been described, what is claimed as new and desired to be secured by Letters Patent is:

1. A pill cutter comprising an upper member and a lower member which are affixed together at one end thereof, a resilient pad affixed to each of said upper and lower members and disposed so as to compressingly engage one another when said upper and lower members are pressed together, one of said resilient pads being of continuous area covering a continuous area of one of said members, the second pad covering a similar area of the other member but comprising a split construction slightly spaced apart, a cutting element disposed between the split apart portions of said second split resilient pad, a pill to be cut placed upon one of said resilient pads, said upper and lower members pressed together to initially contain said pill compressed between said resilient pads, and said cutting element engaging and splitting said pill upon said upper and lower members being pressed together sufficiently to compress said resilient pads and bring said pill into engagement with said cutting element, at least one of said resilient pads comprising a recessed pocket for receiving therein a pill to be cut.

2. The pill cutter of claim 1 wherein each of said resilient pads includes a recessed pocket for the pill.

* * * * *